United States Patent [19]
Leighton et al.

[11] Patent Number: 5,432,852
[45] Date of Patent: Jul. 11, 1995

[54] LARGE PROVABLY FAST AND SECURE DIGITAL SIGNATURE SCHEMES BASED ON SECURE HASH FUNCTIONS

[76] Inventors: Frank T. Leighton, 15 Charlesden Park, Newtonville, Mass. 02160; Silvio Micali, 459 Chestnut Hill Ave., Brookline, Mass. 02146

[21] Appl. No.: 128,514

[22] Filed: Sep. 29, 1993

[51] Int. Cl.⁶ .......................... H04L 9/00; H04L 9/30
[52] U.S. Cl. ........................................ 380/30; 380/21; 380/23; 380/25; 380/49
[58] Field of Search ....................... 380/21, 23, 25, 30, 380/43, 49

[56] References Cited

U.S. PATENT DOCUMENTS

| | | | |
|---|---|---|---|
| 4,771,459 | 9/1988 | Jansen | 380/21 |
| 4,932,056 | 6/1990 | Shamir | 380/23 |
| 4,944,009 | 7/1990 | Micali et al. | 380/30 X |
| 5,016,274 | 5/1991 | Micali et al. | 380/23 |
| 5,136,646 | 8/1992 | Haber et al. | 380/49 |
| 5,136,647 | 8/1992 | Haber et al. | 380/49 |
| 5,231,668 | 7/1993 | Kravitz | 380/30 X |
| 5,263,085 | 11/1993 | Shamir | 380/30 |

OTHER PUBLICATIONS

A. Fiat and A. Shamir. "How to Prove Yourself: Practical Solutions of Identification and Signature Problems." Proceedings of CRYPTO 86. Santa Barbara, Calif., Aug. 1986, pp. 186–194.

C. Schnorr. "Efficient Identification and Signatures for Smart Cards." Proceedings of of CRYPTO 89. Santa Barbara, Calif., Aug. 1989, pp. 239–251.

*Primary Examiner*—Bernarr E. Gregory
*Attorney, Agent, or Firm*—David H. Judson

[57] ABSTRACT

The present invention describes new digital signature schemes that are provably secure against any adaptive chosen-message attack. The scheme, which is based on selection of a hash function from a space of such functions, has a very short public key, fast signing, a reasonable signature length and high security. Several algorithmic techniques are provided for enhancing the efficiency of the signature scheme in terms of time and memory.

12 Claims, 4 Drawing Sheets

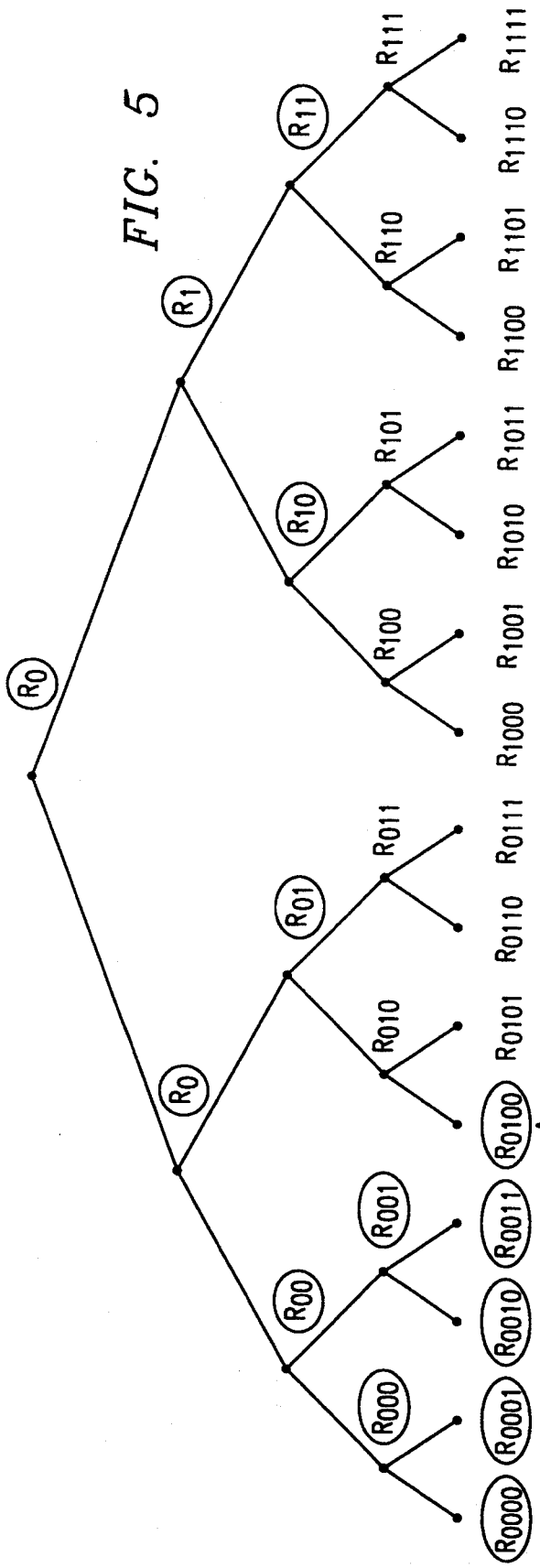
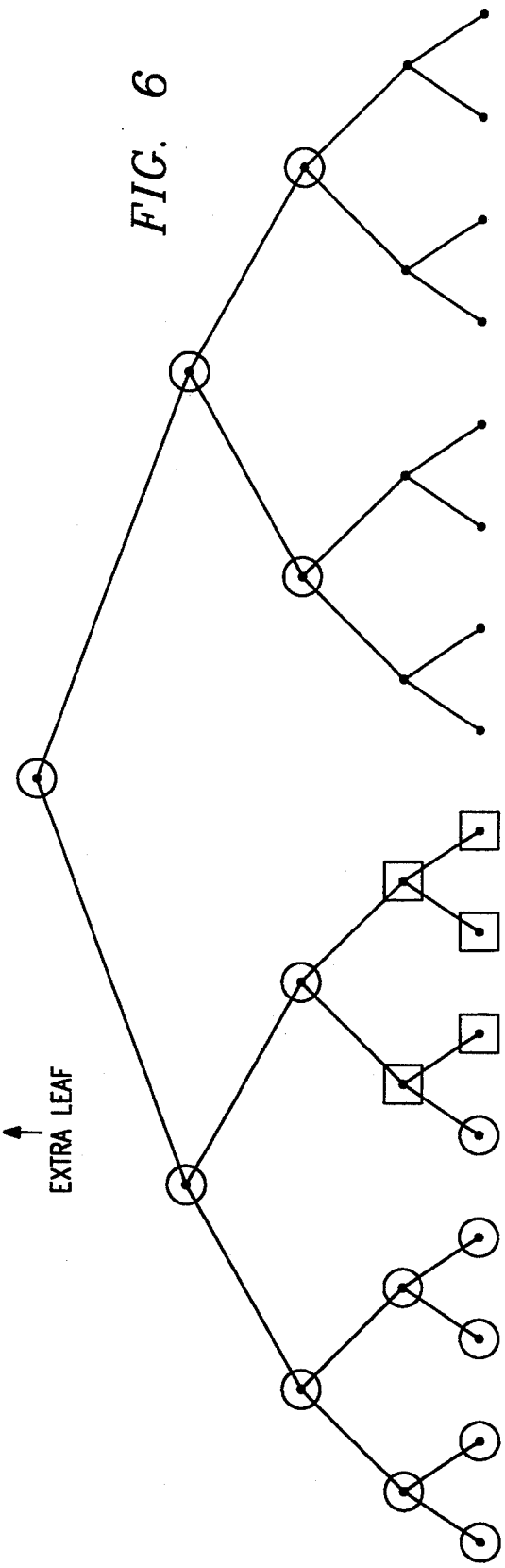
FIG. 5
FIG. 6

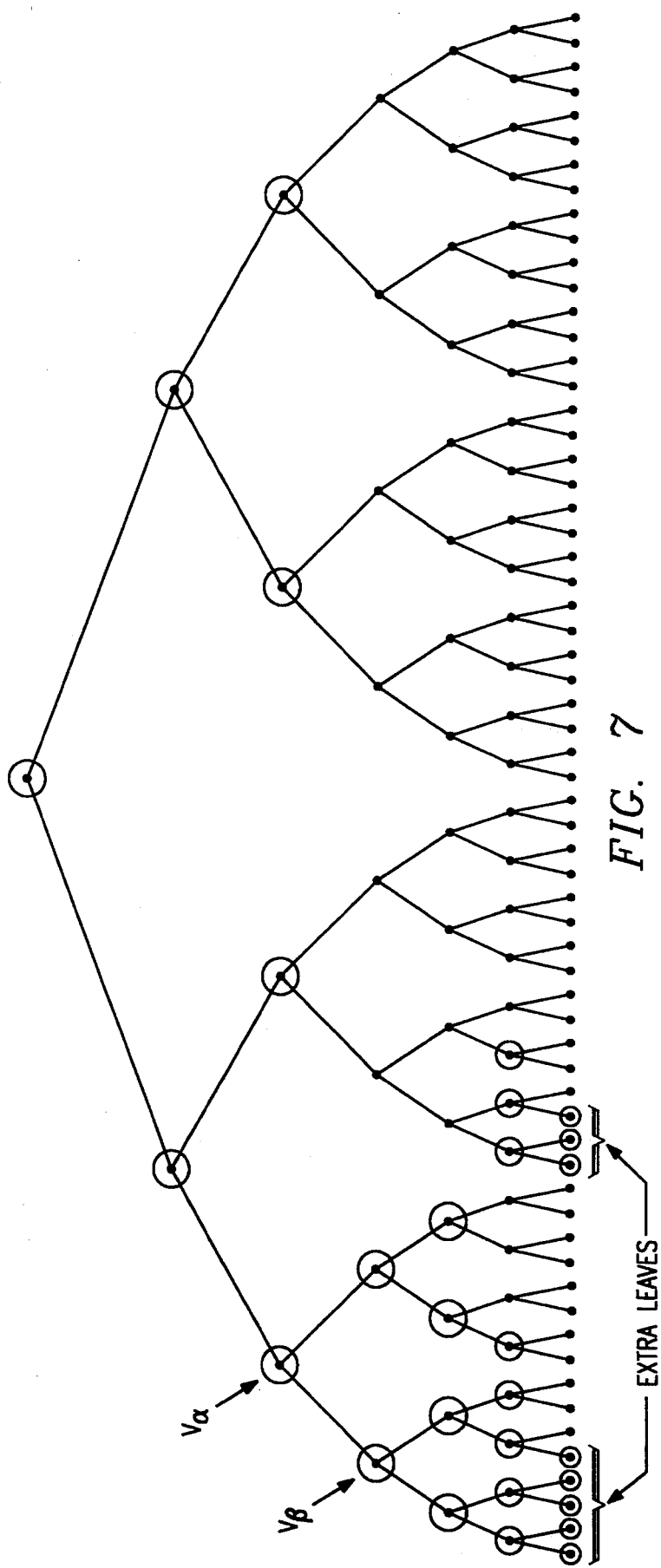

LARGE PROVABLY FAST AND SECURE DIGITAL SIGNATURE SCHEMES BASED ON SECURE HASH FUNCTIONS

TECHNICAL FIELD

The present invention relates to secure communications and more particularly to new digital signature schemes that are provably secure against any adaptive chosen-message attack.

BACKGROUND OF THE INVENTION

In recent years, there has been a dramatic increase in the need for systems that can protect digital data from potential eavesdroppers, forgers, and other adversaries. This is largely due to the fact that an unprecedented portion of all commercial transactions and communications are now handled with digital electronics. In addition, the sophistication of potential adversaries has increased, which has made the problem of protecting digital data even more pressing.

In response to this need, a wide variety of interesting and novel schemes have been developed for protecting and authenticating digital data. The problem now faced by many corporations and government bodies is to choose a scheme from among the many that will be both secure and economical. NIST, in particular, is faced with the task of selecting "standard" methods for encrypting and authenticating data.

Traditionally, written data has been authenticated by appending the handwritten signature of the appropriate individual to the data. Modern methods for authenticating digital data proceed in a similar fashion except that the handwritten signature is replaced with a digital signature. The digital signature consists of a stream of bits which is computed by the signer based on the message being signed. The digital signature should have the properties that anyone can verify that a signature is the valid signature of the signer for the associated message, and that only the signer is able to generate the signature.

The most popular method for computing digital signatures today is the RSA scheme. In the RSA scheme, each individual is provided with a secret pair of large (e.g., 500-digit) prime numbers $P_1$ and $P_2$. The pair $(P_1, P_2)$ is referred to as the secret key for the individual. The corresponding public key for the individual is the pair $(Q, r)$ where $Q = P_1 P_2$ and $r$ is a fixed positive integer that is relatively prime to $P_1 - 1$ and $P_2 - 1$. The signature for a message M is a number x for which $x^r = h(M) \mod Q$. The function h is a publicly-available hash function that maps any data string M into a k-bit number where $k \leq \log Q$. The step of computing $h(M)$ is known as pre-hashing. This initial step is common to all known digital signature algorithms because applying the signing procedure directly to M, rather than $h(M)$, is either impossible or impossibly time-consuming. The hash function h used for pre-hashing needs to have two important properties: it must be easy to compute $h(M)$ given M but impossibly hard to compute M given $h(M)$, and it should be impossibly hard to find two strings M and M' such that $h(M) = h(M')$.

Many similar schemes have also been proposed, including the well-known DSA algorithm. The practicality of schemes such as RSA and DSA is based on several factors: it is not overly difficult for an individual's computer to produce a signature x for a message M given that the computer knows the secret key $(P_1, P_2)$, the fact that it is relatively easy for someone else's computer to verify that x is a signature for M given knowledge of the public key $(r, M)$, the fact that the signature itself is relatively short (e.g., it consists of about 1000 bits), and the fact that the public key is also relatively short (e.g., it also consists of about 1000 bits).

The security of schemes such as RSA and DSA is based on the hope that it is impossible for an adversary to produce a signature for any message M without knowledge of the private key, even if the adversary is aware of the public key and can obtain valid signatures for messages other than M. More specifically, the security of these prior art schemes is based on the hope that number-theoretic problems such as factoring and computing discrete logarithms are impossibly hard for almost all large numbers, the hope that it is impossibly hard to find a collision for the hash function (i.e., to find a pair of messages M and M' such that $h(M) = h(M')$) and that it is impossibly hard to invert the hash function (i.e., to compute an M such that $h(M) = z$ given z), and the hope that an adversary must perform one of the preceding (presumably difficult) tasks in order to be able to forge a signature.

For example, if the adversary is able to factor, then he can compute the private key from the public key, whereupon he can begin to forge signatures at will for the RSA scheme. If the adversary can compute discrete logarithms, then he can compute forged signatures for the DSA scheme directly, without knowledge of the secret key. Moreover, if the adversary can find two messages M and M' for which $h(M) = h(M')$, then he can forge a signature for M' by obtaining a legitimate signature for M (since the signatures for M and M' are the same). If the adversary can invert h, then he can forge signatures by an alternative method using a slightly more complex attack. Finally, it might be possible for an adversary to forge signatures using an altogether different as-yet-unknown attack. Hence, in addition to the hope that it is not possible to achieve a known attack, the security of schemes such as RSA depend on the hope that there are no easier alternative attacks. In summary, this means that the security of signature schemes such as RSA and DSA is based on assumptions which may not always be defensible.

It is also known in the prior art how to convert a hash function into a 1-time signature scheme, i.e., a signature that is used with one particular message and then discarded. If the hash function is ideal (or at least secure against inversion), then the signature scheme will be secure against forgery. In one known technique, the Basic Lamport Scheme, there are two important parameters: k and m. The value of m denotes the length of the message to be signed and it must be specified in advance. The parameter k is the security parameter and h is a hash function with k-bit outputs. The secret signing key $K_s$ consists of $2m$ randomly-generated strings $A_1, \ldots, A_m, B_1, \ldots, B_m$, each with k bits. The corresponding public verification key $K_p$ consists of $X_1, \ldots, X_m, Y_1, \ldots, Y_m$, where $X_i = h(A_i)$ and $Y_i = h(B_i)$ for $1 \leq i \leq m$. The signature of an m-bit message $M = b_1 \ldots b_m$ consists of $S_1, S_2, \ldots, S_m$ where $S_i = A_i$ (if $b_i = 0$) and $B_i$ (if $b_i = 1$). The signature is verified by checking that $h(S_i) = X_i$ (if $b_i = 0$) and $Y_i$ (if $b_i = 1$).

The Basic Lamport Scheme has been improved in various ways. One improvement, the Lamport/2 Scheme, essentially halves all the costs of the basic scheme. In the Lamport/2 scheme, the signer chooses the secret key by selecting at random $m + n + 2$ k-bit strings $A_1, \ldots, A_m, B_1, \ldots, B_n, C_0, C_1$, where $n = \lceil \log([m/2]+1) \rceil$. The signer then sets the corresponding public key to consist of the values $X_i = h(A_i)$ for $1 \leq i \leq m$, $Y_j = h(B_j)$ for $1 \leq i \leq n$, and $Z_d = h(C_d)$ for $d = 0, 1$. The signature of an m-bit message $M = b_1 \ldots b_m$ is computed as follows. If more than $m/2$ of the m bits of M are zeros, then the signer complements all of the bits of M and sets $d = 1$. Otherwise, the $b_i$ are left unchanged and d is set to 0. The signer next computes the number e of zeros among the $b_i$'s. Since by definition, $0 \leq e \leq m/2$, the binary representation of e is $e_1 \ldots e_n$. If $\epsilon$ denotes the empty string, the signature of M then consists of $S_1, \ldots, S_m, T_1, \ldots, T_n, U$ where $S_i = A_i$ (if $b_i = 0$) and $\epsilon$ otherwise for $1 \leq i \leq m$, and $T_j = B_j$ (if $\epsilon_j = 0$) and $\epsilon$ otherwise for $1 \leq j \leq n$, and $U = C_d$. The signature of M is verified by first computing d from U and the two Z-values in the public key, and then checking that each of the appropriate preimages of h has been correctly supplied in the signature.

The main drawback of the 1-time schemes described above is that they can only be used to sign a single message. To overcome this disadvantage, it is also known in the prior art how to convert a 1-time scheme into an N-time scheme, where N is an arbitrarily large parameter that is selected in advance. In one trivial technique, any of the 1-time schemes described above can be converted into an N-time scheme by simply forming a set of N secret and public keys and using each set once. The public (and secret) key for the N-time scheme will then be the union (or concatenation) of the individual 1-time keys.

Unfortunately, there are two serious problems with this approach. First, the public and secret key are enormous. For example, even if $N = 1000$, the public key will consist of millions of bits, which is clearly not practical for most applications. Second, the scheme is vulnerable to attack since the adversary only has to find the preimage of one of the strings in one of the 1-time keys in order to forge a signature. As the number of targets increases, the security of the overall N-time scheme decreases substantially.

One technique for overcoming the difficulties with key length in the trivial N-time scheme is the so-called Basic Merkle Scheme. In this scheme, the signer starts by setting up N 1-time schemes using a common hash function h. Let $K_s^{(i)}$ denote the secret key of the ith 1-time scheme and let $K_p^{(i)}$ denote the public key of the ith 1-time scheme for $1 \leq i \leq N$. Then the secret key of the N-time scheme will be $K_s = K_s^{(1)}, \ldots, K_s^{(N)}$. The public key of the N-time scheme is obtained using a tree-based hashing procedure. In particular, let tn denote the complete binary tree with N leaves, and label the nodes of $\tau n$ so that $v_\phi$ is the root (where $\phi$ denotes the empty string), $v_0$ and $v_1$ are the left and right children of $v_\phi$, respectively, and so that $v_{\alpha 0}$ and $v_{\alpha 1}$ are the left and right children of $v_\alpha$, respectively, for all $\alpha$ belonging to $[0,1]^i$ where $i < \log N$. Each node in the tree has a special memory location that contains a k-bit hash value. The value stored in node $v_\alpha$ is $R_\alpha$ for all $\alpha$ ($0 \leq (\alpha) \leq \log N$). The value stored in the jth leaf $v_{bin(j)}$ is $R_{bin(j)} = h(K_p^{(j)})$ for $0 \leq j < N$, where $bin(j)$ denotes the log N-bit binary representation of j and h is a hash function with k-bit outputs. The values stored in the interior nodes of the tree are computed in a bottom-up fashion as follows. The value stored in node $v_\alpha$ is $R_\alpha = h(R_{\alpha 0} R_{\alpha 1})$ for all $\alpha$ ($0 \leq (\alpha) \leq \log N$). The k-bit value $R_\phi$ that is computed and stored at the root serves as the public key $K_p$ for the N-time scheme.

In the Basic Merkle Scheme the signature for a message M is formed as follows. Let i denote the number of signatures performed previously by the owner of the tree $\tau_N$ (for $0 \leq i < N$) and let $b_1 b_2 \ldots b_{\log N}$ denote the log N-bit binary representation of i. In addition, define $\alpha_j = b_1 b_2 \ldots b_{j-1} b_j$ for $1 \leq j \leq \log N$. Then the signature for M consists of the signature for M produced by the ith 1-time scheme (counting starting with $i = 0$) along with i, the public key $K_p^{(i)}$ of the ith 1-time scheme, and $R_{\alpha j} 1 \leq j \leq \log N$. Given i, $K_p^{(i)}$, and $R_{\alpha j} 1 \leq j \leq \log N$, it is easy for the verifier to check that the signature is authentic. First, the verifier checks that the portion of the signature for the ith one-time scheme is valid assuming that the declared value of $K_p^{(i)}$ is indeed the public key for the ith one-time scheme. Next, the verifier checks that $K_p^{(i)}$ is authentic by computing $R_{alpha}$ for all alpha that are prefixes of bin(i). These are the values contained in nodes that are on the path from leaf i to the root in $\tau_N$. If the value for $R\phi$ computed by the verifier matches the public key for the tree, then the signature is authentic.

Although the Basic Merkle Scheme has a short public key and short signatures, it has a very large secret key and thus it requires the signer to remember a large amount of data (N secret 1-time keys, N public 1-time keys, and the $2^{N-1}$ R-values of $\tau_N$). The memory requirements of the Basic Merkle Scheme are likely prohibitive for many applications. One solution to the memory problem is to generate all the N 1-time keys from a single and short private key, which serves as the seed for a random number generator, and then reconstruct the entire tree $\tau_N$ prior to signing each message. Although this approach solves the memory problem, it requires a considerable amount of time to produce each signature. Another solution, the Small-Memory Merkle Scheme, requires the signer to remember $(\log^2 N)/2$ R-values from the tree and log N states of the pseudo-random number generator at any time. In addition, the method can generate a signature by regenerating log N secret and public 1-time keys and by performing log N additional hash computations.

The major problem with both the Basic Merkle Scheme and the Small-Memory Merkle Scheme is security. In particular, the schemes are vulnerable to numerous square-root attacks, several of which are described in what follows. As a consequence, a signer using one of these schemes will need to use values of k and m that are at least twice as large as the values that would be needed for any 1-time scheme in isolation. This means that key lengths, signature lengths, signing times, memory requirements, and verifying times will all need to be increased by an order of magnitude in an attempt to make up for these insecurities.

The best known of these attacks is the attack on the pre-hashing. This is a chosen-message attack aimed at the messages to be signed. It works whenever the digital signature of a long message M is obtained by first hashing the message and then properly signing h(M). In this attack, the enemy chooses $2^{m/2}$ messages $M_i$ and then computes the m-bit values $h(M_i)$ which will be actually signed. By the birthday paradox, with constant probability he finds i and j such that $h(M_i) = h(M_j)$. Then, by requesting and obtaining the signature of $M_i$ from the signer, the enemy forges the signature of $M_j$. Hence Merkle's algorithm and all previously known signing algorithms are at most $2^{m/2}$ secure (as defined herein, this measure of security means that a signature can be forged with reasonable probability by an algorithm running in $2^{m/2}$ steps), even if h is an ideal hash function.

It should be appreciated that in such a forgery the enemy may essentially choose the message whose signature is forged. For example, the forger may compute a set $2^{m/2}$ h-hashed "innocent" messages (i.e., requests for very small payments), a set of $2^{m/2}$ h-hashed "advantageous" messages (i.e., requests for very large payments), and then look for a point in the intersection of these two sets. Then, by obtaining a signature for a single small check, the forger will be able to forge the signature of a large check. This weakness forces all prior digital signature schems to use a large value of m.

Another form of attack of the Merkle Scheme is the tree attack which works regardless of the 1-time signature scheme employed at the leaves and regardless of what pseudo-random number generator is used to generate 1-time secret keys. The first attack is a collision-based attack aimed at the leaves of the tree. Leaf i stores the k-bit value $R_{bin(i)} = h(K_p^{(i)})$, which is authenticated via the sequence of R-values comprising the ith authenticating path. In this attack, the enemy tries to compute a 1-time public key $K_p$ for which he knows the corresponding secret key and for which $h(K_p) = h(K_p^{(i)})$ for some small i. Then, he can use one of the authenticating paths (namely the ith path) that has already been released by the legitimate signer to forge an authentication of $K_p$. If the signer has signed $2^{k/2}$ messages, then $2^{k/2}$ leaf values have become available to the enemy. The enemy then generates $2^{k/2}$ 1-time public keys, $K_p^{(1)'}, \ldots, K_p^{(2^{k/2})'}$, together with their corresponding secret keys, and hashes them to k-bit values by using h. By the birthday paradox, with constant probability, he finds an a and b such that $1 \leq a, b \leq 2^{k/2}$ and $h(K_p^{(a)}) = h(K_p^{(b)'})$. In this case, the legitimate ath authenticating path also authenticates $K_p^{(b)'}$, and since the enemy knows $K_s^{(b)'}$, he can then forge the signature of any message he wants. Thus in this attack, the enemy pretends that the forged signature is that of the ith message, since the current total number of messages legitimately signed is not generally available to the verifier.

Thus, the Merkle Scheme is at most $2^{k/2}$-secure, even if h is an ideal hash function. Moreover, the attack can also be applied to the internal nodes of the signing tree. Once $2^{k/2}$ R-values have been revealed on any level of the tree (or in any collection of trees), the enemy can mount a collision-based attack by generating a tree of his own choosing and hoping to match an R-value on the same level of the tree. The attack can also be extended for use with many signers. Thus even if the Merkle scheme were made secure for a single signer, problems can arise when there are many signers. In particular, once a total of $2^{k/2}$ messages have been signed, a collision-based attack can proceed as before.

Thus, the N-time Merkle Scheme is generally described given an "abstract but secure" 1-time signature scheme. As noted above, however, no matter what the 1-time signature scheme may be, the Merkle schemes are prone to attacks. Depending on the 1-time signature scheme that is used, however, there may also be additional attacks. For example, depending on the 1-time scheme used, then it is also possible to apply a collision attack aimed at the individual hashes in the 1-time public key. In particular, once a total of $2^{k/2}$ hash values have been revealed (and m or more are revealed for each signature), then the attacker can apply a collision-based attack to find a preimage of one of the hashes in one of the 1-time public keys in about $2^{k/2}$ steps. Once a preimage is found, then the attacker can forge a signature by using a chosen-message attack. Hence, the forger can expect to be able to produce a forgery in about $2^{k/2}$ steps.

There are also attacks on the Small-Memory Merkle Scheme aimed at the pseudo-random number generator. Even if the pseudo-random number generator is unpredictable, if it is used in a standard way, a collision-based attack can be used to invert the generator.

To overcome some of these significant problems, Merkle has proposed an Alternative Merkle Scheme in which each node contains a 1-time scheme that is used to authenticate the 1-time schemes in its left and right children. The public key of the scheme is the same as the public key of the 1-time scheme in the root of the tree. This scheme has the advantage that the value of N does not need to be fixed in advance, but has the greater disadvantage that the signatures become very large as N increases, which makes the scheme impractical for even moderate values of N. The scheme also has security problems that are analogous to those described above.

As a result of the current state of the prior art, there remains a long felt need for provably fast and secure digital signature algorithms based on secure hash functions.

BRIEF SUMMARY OF THE INVENTION

It is a principal object of the present invention to describe an efficient method for converting a hash function into a digital signature scheme.

It is another object of the invention to provide a digital signature scheme in which it can be proved that in order to forge the signature of any single message an adversary must be able to "break" the underlying hash function; therefore, if the underlying hash function is secure, then so is the digital signature algorithm.

It is a further object of the invention to describe such a signature scheme that is provably secure in view of a concrete measure of security that allows counting of the precise number of computational steps that any adversary needs to take in order to forge the signature of even a single message.

It is still another object of the invention to provide a new technique for hashing in the context of signing that is provably immune to square-root attacks. The technique facilitates hashing of long messages into very short strings, thereby gaining speed without compromising security.

It is yet another object of the invention to provide a scheme whose security relies on fewer assumptions that prior art schemes which are vulnerable to forgery if the underlying hash function is insecure or if fast algorithms are developed for problems such as factoring or discrete-log. The inventive scheme relies on no more assumptions than any scheme which one-way hashes a message as the first step in producing the digital signature for the message.

It is another object of the invention to provide a signature scheme which works given any secure hash function h whose security does not depend on number theory. Thus, the inventive scheme is invulnerable to any attack based on algorithmic advances for problems such as factoring integers or finding discrete logarithms.

It is still a further object of the invention to provide a signature algorithm that cannot be easily converted into a public-key encryption algorithm.

It is another important object of the invention to provide a new signature scheme that has significantly shorter public keys than prior art schemes, can be implemented without special-purpose hardware or software for large-integer arithmetic, and, depending on the secure hash function that is used, requires substantially less time for signing and verifying than prior art schemes including RSA and DSA.

It is a further object of the invention to provide new techniques whereby once the risk of standardizing a hash function is accepted, no additional risk need be taken (and no additional testing need be performed) to standardize a digital signature scheme (since the digital signature scheme described herein is provably secure if the hash function it uses is secure).

A further object of the invention is to provide a signature scheme which is secure (or can be made secure with simple modifications) even if the underlying hash function is not ideal. All that is needed is that it be difficult to find inverses for the hash function.

It is another object of the present invention to provide a secure digital signature wherein any form of generalized directed acyclic graph (with plural authenticating paths) is used for obtaining a public key of an N-time scheme.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 5 is a further representation of the tree showing the R-values that are remembered after an initialization phase;

FIG. 6 is still a further representaiton of the tree showing the R-values for the squared nodes;

FIG. 7 shows a representation of a tree according to the $N^{\frac{1}{2}}$ algorithm of the present invention for $\tau_{64}$; and FIG. 8 shows a preferred embodiment of the invention wherein a generalized directed acyclic graph (with plural authenticating paths is provided).

Similar reference characters refer to similar steps throughout the several views of the drawings.

DETAILED DESCRIPTION

Figure 1:
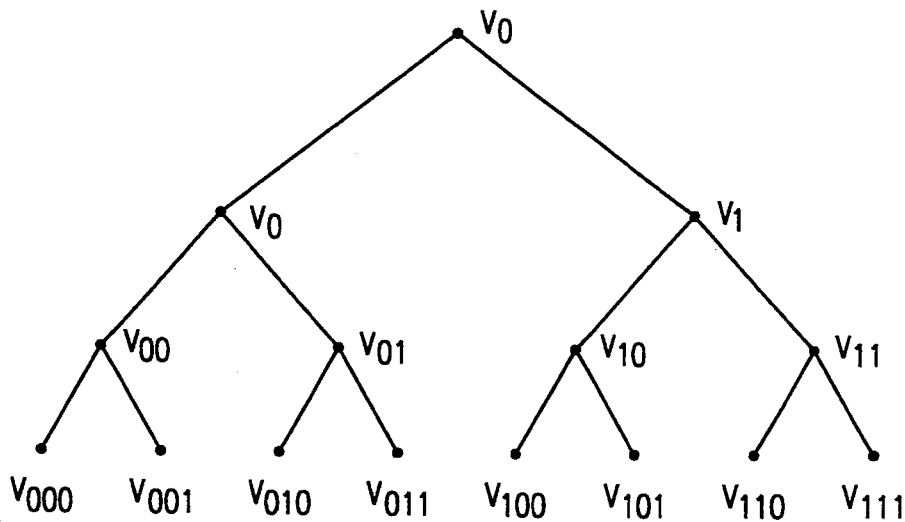
FIG. 1 is a diagram of an 8-leaf binary tree $\tau_8$ for use in the LM Scheme of the present invention.

The principal object of the invention is to provide a method for authenticating data with digital signatures. Like the prior art RSA and DSA techniques, the method is practical in that it is relatively easy to compute a signature given the secret key, and it is easy to verify a signature given the public key. In addition, the public keys and signatures for the method are very short. The main advantage of the new method, however, is its security. Unlike RSA or DSA, the security of our method does not rely on the hope that number-theoretic problems such as factoring and discrete-log are intractable. Nor does the scheme rely on the hope that such an intractable problem needs to be solved in order to forge a signature. Rather, the security of the scheme relies solely on the security of the associated hash function h. If the hash function is random or if it is otherwise secure (as defined herein), then the digital signature algorithm based on such hash function is provably secure against forgeries.

All known signature schemes (including the present invention) require the existence of a secure hash function in order to be secure against forgery. For example, if h is easy to invert, then it is possible to forge RSA signatures even if factoring turns out to be hard. The difference between the inventive method and schemes such as DSA and RSA is that such schemes also require number theoretic problems such as factoring and discrete-log to be intractable in order to be secure. The present method requires no such additional assumptions.

To facilitate an understanding of the present invention, some additional background information is now described with respect to digital signature schemes and hash functions.

Digital Signature Schemes

A digital signature scheme consists of the following entities: a random number generator R for producing random numbers for each individual, a key generation algorithm G for producing public and private keys for each individual, a signing algorithm S for computing digital signatures, and a verification algorithm V for verifying digital signatures. Each component of the scheme must run in polynomial time, and at least the random number generator should be probabilistic. In addition, each component depends on a security parameter k that determines the size of the random numbers, the size of the secret and public keys, and the amount of computational effort required to forge a signature.

The random number generator R assigns a secret random number R(I) to each individual. The variable I is used to denote the identity of an individual. This number is used to derive a secret key for the individual using the key generation algorithm. The length of the random number depends on k and the signature scheme. If desired, the value of R(I) can be computed by the individual himself (i.e., each individual can select his or her own random number R(I)). The key generation algorithm G takes as input the identity of the individual I for whom the keys are being produced, the value of R(I), and the security parameter k. The output of the algorithm consists of a public key for I (denoted by $K_p^{(I)}$) and a secret key for I (denoted by $K_s^{(I)}$). The pair $(I, K_p^{(I)})$ are published so that everyone has access to everyone else's public key. The key generation algorithm is also public, but each individual can still produce their own keys in private, since the random numbers used to produce the keys are secret.

The signing algorithm S takes as input the secret key $K_s^{(I)}$ and identity number I of the individual who is signing, the message M that is being signed, and the index i of the message that is being signed. (The index of the message is i if the signer has previously signed i−1 other messages.) The output of the signing algorithm is a bit-string $\sigma$ that forms the digital signature of the signer for the message. The verification algorithm V takes as input the message that was signed M, the public key $K_p{}^{(I)}$ and identity number I of the individual who produced the signature, and the signature $\sigma$. The output of the algorithm is either valid or invalid. In particular, it must be the case that $V(I,K_p{}^{(I)},M,\sigma)=$Valid if $S(I,K_s{}^{(I)},M,i)=\sigma$ for any I, M, i, and $\sigma$. In other words, the verification algorithm must correctly recognize any valid signature. As described herein, the algorithms for signing, verifying, and key generation will also depend on a parameter N that denotes an upper bound on the number of signatures that will ever be computed (collectively over all individuals). They may also depend on a parameter B that denotes an upper bound on the number of bits that will ever be signed using the system. The values of N and B can be arbitrarily large, and they are present primarily for the analysis of security.

Hash Functions

Signature schemes make use of a hash function h as part of the signing process. For example, in RSA, the first step in signing a message M is to compute h(M). In order for such schemes to be secure, it is important that h satisfy several properties. For example, it is very important that it be computational infeasible for an adversary to find a collision for h. A collision for h is a pair of strings M and M' such that h(M)=h(M'). This is because the signature for a message M using RSA (or any similar algorithm) only depends on h(M). If h(M)=h(M'), then the adversary can forge a signature for M' by first obtaining a valid signature for M (since both strings will have the same signature).

Any function from $[0, 1]^*$ to $[0, 1]^m$ (where m is a predetermined parameter) can be a hash function. Usually a hash function is picked at random from a family of functions with some specific structure. For example, an ideal hash function herein means a function that is selected at random from the space of all functions with domain $[0,1]^*$ and range $[0,1]^m$. In other words, the ideal hash function is a function that assigns a random m-bit number to every string. So, reference to a single function h refers to a randomly-chosen function from a set of functions. (Typically m will be equal to the security parameter k.)

Ideal hash functions have several useful properties. For example, it is provably hard to find a collision for ideal hash functions. In fact, as will be seen it is possible to show that any t-step algorithm that attempts to find a collision for an ideal h can only do so with small probability. In addition, ideal hash functions are hard to invert. This can be expressed in two ways. First, given h(M) where M is an unknown random m-bit string, it is hard to find an M' (possibly equal to M) such that h(M)=h(M'). Second, given a random m-bit string z, it is hard to find an M' such that h(M')=z (if such an M' even exists). Lastly, ideal hash functions are a good source of randomness. For example, h(00), h(01), h(10), and h(11) are all independent random strings in $[0,1]^m$. Hence, h can be adapted for use as a pseudo-random number generator. In fact, one can treat an ideal hash function as a random oracle, which given a string omega as a query, responds with a random m-bit number that is defined to be the value of $h(\theta)$.

According to the invention, it will be seen how to use a hash function to construct a digital signature scheme. If the hash function is ideal, then the signature scheme will be $2^{m-1}$-secure. By making m large (say 100 or 200), then the signature scheme is immune to forgery. In addition, each public key will consist of m bits, and each signature will consist of a few thousand bits. The signing process will consist of hashing a few thousand bytes of data (in addition to M). Most of the hashing can be performed ahead of time in an off-line fashion. The verification process also consists of hashing M along with a few thousand bytes of data. Overall, the scheme will rival or beat schemes such prior art schemes as DSA or RSA in terms of speed and efficiency, and it will dominate them in terms of security.

A Concrete Measure of Security

With this background, a new formal definition of what it means for a digital signature scheme to be secure against forgery is now provided. Unlike most definitions of security, which are asymptotic in nature, the present invention adopts a definition of security that specifies in a concrete fashion how much time will be needed by the strongest possible adversary to generate a forged signature. The following also defines what it means for a hash function to be secure, and the properties of a hash function which are sufficient to guarantee the security of the signature scheme are also described.

For a digital signature scheme to be useful, it is necessary that a forger not be able to compute a valid signature. More generally, it is necessary that the forger not be able to compute any triple $\sigma$, I, and M for which $V(I,K_p{}^{(I)},M,\sigma)=$Valid.

There are many ways one could try to formalize the preceding requirement, depending on how much power is given to the potential forger and on how "useful" the string M must be for a forgery to be considered successful. In this invention, the strongest possible definition of security is adopted. In particular, it is assumed the potential forger is allowed to conduct an adaptive chosen-message attack, and the forger is considered to be successful if he or she finds any I, M, and $\sigma$ for which $V(I,K_p{}^{(I)},M,\sigma)=$Valid. The only exclusions will be values of M and I for which a signature for M is directly obtained from I as part of the chosen-message attack. (In an adaptive chosen-message attack, the forger is allowed to obtain a signature for any message of his choosing at each step of the attack. Moreover, the message that is chosen at each step can depend on the signatures that were obtained for messages chosen at prior steps.)

The present invention measures the security of a signature scheme in a very concrete manner by specifying a precise lower bound on the amount of time that will be required by an adversary to have a $\rho$ chance of producing a forgery. The probability $\rho$ is based on the random number generator R as well as any randomization that is used in G, S, V, or the attempt to produce a forgery. In particular, the present invention formally defines the security of a digital signature scheme as follows.

Definition 1.

A digital signature scheme (R,G,S,V) is said to be it T-secure if for all t>0 and for all adaptive chosen-message forging algorithms F that run in t steps (and that have fewer than t lines of code), the probability that F can produce a triple $(I,M,\sigma)$ for which:

the value of $S(I,K_s{}^{(I)},M,i)$ was not provided to the forger by a signer as part of the chosen-message attack (for any i), and $V(I,K_p{}^{(I)},M,\sigma)=$Valid, is at most $\rho \leq t/T$. The probability $\rho$ is taken over all randomness that occurs in the use of R, G, S, V, and F during the attack.

For example, if a digital signature scheme is $2^{200}$-secure, then the probability that a forger can produce some valid signature for some signer and some message (that has not already been signed by that signer) in less than $2^{100}$ steps is at most $2^{-100}$.

This definition of security represents a dramatic departure from traditional definitions of asymptotic security which are based on the notions of polynomial and exponential time. In particular, the definition provided here has the advantage of being very concrete. It allows the user of the signature scheme to specify precisely the level of security desired. For example, it can be argued that there will not be enough computational cycles available in the next 50 years (worldwide) to have more than a $2^{-40}$ chance of being able to produce even a single forgery for a signature scheme that is $2^{170}$-secure. For most practical purposes, it is probably sufficient that a scheme be $2^{100}$-secure, since 1000 machines that run 1000 times faster than today's fastest Teraflops machines would still need to run for several millenia before having any reasonable chance of producing a single forgery (even a potentially worthless forgery). Even better, the security still holds even if mathematicians figure out how to factor numbers and compute discrete logs.

The definition of security adopted herein is much more stringent than other definitions typily found in the literature. In addition to being concrete instead of asymptotic, the definition upper bounds the probability of a successful forgery within a certain time frame. This is much more useful than lower bounds on the expected time needed to forge since the expected time to forge might be very large even though the chances for a quick forgery are high. In addition, the definition allows for an adaptive chosen-message attack, and the attack is considered to be successful if the adversary succeeds in forging any message (even one that is of no use). These distinctions are important since there are popular schemes in the prior art that are hoped to be secure under less stringent definitions of security, but which are known to readily succumb to the kind of attacks permitted under the disclosed definition of security. For example, the RSA scheme is well-known to be susceptable to very damaging chosen-text attacks if it is not used in conjunction with a secure hash function. Even when used with a secure hash function, however, there is no reason to believe that number theoretic schemes such as RSA are immune to chosen-text attacks (even if the underlying number-theoretic problem turns out to be hard). This drawback limits the usefulness of such schemes in practice.

The above definition of security is also particularly useful in conjunction with the analysis of any signature scheme and it can be modified for use in analyzing schemes for related problems such as encryption. In addition, the concreteness of these definitions provides a solid mathematical framework within which issues such as security can be accurately studied.

As discussed above, it is known in the prior art to convert a hash function into a 1-time signature scheme. These schemes include the Basic Lamport Scheme and the Lamport/2 Scheme. Known schemes (Merkle) for converting 1-time signature schemes into N-time schemes have also been described. The various problems and deficiencies of such prior art techniques have also been fully explored. With such background, it is now possible to describe the inventive method for computing digital signatures (hereinafter referred to as the LM Scheme for convenience). Before doing so, it is first desirable to describe a novel 1-time signature scheme which will prove useful in the LM Scheme. This novel 1-time signature scheme is referred to as the Partitioned Lamport/2 Scheme and is described briefly below.

The Partitioned Lamport/2 Scheme

Although the Lamport/2 Scheme is very fast, the key and signature lengths may be too high for some applications. In what follows, a modified novel scheme is described for which the public-key and signature lengths are decreased, although the time to sign and verify increases as a result. This scheme is particularly useful when the hash function can be computed very quickly (as is the case with DES-based hash functions).

Let q be a small integer (say, 4, 5 or 6) and define $r=[m/q]$, $s=[\log([r(2^q-1)/2]+1)]1$, and $t=[s/q]$. Then the secret key for the Partitioned Lamport/2 Scheme is generated by selecting $r+t+2$ random k-bit numbers $A_1, \ldots, A_r, B_1, \ldots, B_t, C_0, C_1$. The corresponding public key will consist of $X_1, \ldots, X_r, Y_1, \ldots, Y_t, Z_0, Z_1$ where $X_i = h^{2^q-1}(A_i)$ for $1 \leq i \leq r$, and $Y_j = h^{2^q-1}(B_j)$ for $1 \leq j \leq t$, and $Z_d = h(C_d)$ for $d=0,1$. The notation $h^p(x)$ denotes the value obtained when h is iteratively applied to x p times.

In order to sign an m-bit message $M = b_1 \ldots b_m$, the signer partitions the bits of M into r (i.e., [mq]) groups of q bits each. (The last group may have fewer than q bits if q does not evenly divide m.) Let $n_i$ denote the integer value of the ith group of bits for $1 \leq i \leq r$. (For example, the integer value of 0110 is 6.) By definition, it is known that $0 \leq n_i \leq 2^q-1$ for each i. Also define $n = n_1 + \ldots + n_r$.

If $n < r(2^q-1)/2$, then replace each $n_i$ with $2^q-1-n_i$ and set $d=1$. Otherwise, leave the $n_i$'s as they were and set $d=0$. Recompute $n = n_1 + \ldots + n_r$ and notice that $n \geq [r(2^q-1)/2]$.

Next, define $e = r(2^q-1) - n$. Because $n \geq [r(2^q-1)/2]$, we can express e as an s-bit binary number $e_1 \ldots e_s$. Then, partition the bits of e into t $(= [s/q])$ groups of q bits each (except for possibly the last group), and let $m_j$ denote the integer value of the bits in the jth group for $1 \leq j \leq t$.

Then the signature for M is $S_1, \ldots, S_r, T_1, \ldots, T_t$, U where $S_i = h^{n_i}(A_i)$ for $1 \leq i \leq r$, $T_j = h^{m_j}(B_j)$ for $1 \leq j \leq t$, and $U = C_d$. The signature can be verified by computing d, the $n_i$'s, n, e, and the $m_j$'s, and then checking that the correct preimages of the public key have been supplied in the signature. Checking the preimages is accomplished by applying the hash function the appropriate number of times for each entry in the signature to check that the appropriate values in the public key are obtained.

The scheme is called the Partitioned Lamport/2 Scheme because, for q=1, it coincides with the Lamport/2 Scheme except for the fact that at least m/2 hash values in the signature can be left out when q=1 because they will be in the public key. The efficiency of the scheme is as follows. The public-key length is $r+t+2$ (approximately $(m+\log m)/q+3$) k-bit strings. The secret-key length and the memory required is the same. The signature length is $r+t+1$(approximately $(m+\log m)/q+2$) k-bit strings, and the time to make the keys is $(r+t)(2^q-1)+2$ elementary hashings. The time to verify is at most $t(2^q-1)+r(2^q-1)/2+1$ (approximately $(m+\log m)/2q+1$ $(2^q-1)+1$) elementary hashings. For example, if q=2, then the scheme just described saves a factor of two in key length over the Lamport/2 Scheme at the cost of a factor of 3/2 in verification speed. The signature length is the same. For larger values of q, the key and signature lengths can be decreased further, but at the expense of an exponential (in q) increase in verification time.

If m=k=100 and q=4, then r=25, 2q−1=15, s=8, and t=2. If h is an ideal hash function, then the Partitioned Lamport/2 Scheme is $2^{90}$-secure, which should be adequate for most practical applications. In addition, the public key will consist of 2,900 bits and the signature will consist of 2,800 bits. Signing will require at most 405 elementary hashes, and verifying will require at most 218 hashes.

The LM Scheme

The new signature scheme described by this invention is based on a technique for converting a 1-time signature scheme into an N-time signature scheme and on a novel technique for hashing long messages. The LM Scheme is a significant improvement on the Merkle Scheme in that it overcomes all of the security problems inherent in the Merkle schemes. The LM Scheme also has the advantage of being faster and needing less memory to recompute R-values. Most importantly, however, the algorithm is provably secure (according to the definition of security provided herein) if the underlying hash function is secure.

The Basic LM Scheme has similarities to the Basic Merkle Scheme in that the LM Scheme in one embodiment uses a tree of hashed values to authenticate 1-time public keys. (The LM Scheme is more general, however, because any directed acyclic graph can be used and not just a tree as will be seen). The values that are hashed at each point in the LM Scheme are significantly different than those that are hashed in the Merkle Scheme, however. In addition, the hashes that are performed within the underlying 1-time scheme are also very different for the LM Scheme, and the LM Scheme also differs in the way that the pseudo-random number generator is used and in the way that long messages are signed.

As discussed in the Background of the Invention, an N-time scheme can be insecure simply because a naive integration of N 1-time schemes increases the opportunities for an adversary to find a collision in the hash function used for the 1-time schemes. This unfortunate fact remains true even if each 1-time scheme is secure on its own. For example, even though the prior art 1-time schemes are nearly $2^k$-secure (in isolation), they are no more than $2^{k/2}$-secure when considered collectively as part of an N-time scheme (for $N \geq 2^{k/2}$).

Thus, in order to construct a secure N-time signature scheme, it is required to first construct 1-time schemes that will maintain their security even if they are considered to be part of an N-time scheme. This task is accomplished for the Basic Lamport Scheme, by way of example only, in what follows. A similar technique can be used for the other 1-time schemes of the prior art.

In the Basic Lamport Scheme, the secret key consists of 2 m random k-bit strings $A_1, \ldots, A_m$, and $B_1, \ldots, B_m$. The public key also consists of 2 m k-bit strings $X_1, \ldots, X_m$, and $Y_1, \ldots, Y_m$, where $X_i = h(A_i)$ and $Y_i = h(B_i)$ for $1 \leq i \leq m$. In order to make the Basic Lamport Scheme suitable for use with the N-time LM Scheme, it is desirable according to the invention to modify that schem by appending some "security string." In particular, the public key is modified so that $X_i = h(A_i|I|n|i|000)$ and $Y_i = h(B_i|I|n|i|001)$, where $I|n|i|000$ is the security string having the following items: I is the identity string associated with the signer, n is the index of the 1-time scheme for I (i.e., if this is the 10th 1-time scheme for the signer, then n=10), and $1 \leq i \leq m$, and the last three bits are a bit string. Without loss of generality, it is assumed that the length of the identity string is the same for all signers, that n has log N bits, and that i has log m bits. Otherwise, the Basic Lamport Scheme works as before (except that n and I need to be part of the signature).

The reason for appending the 3 bits (which precise bits are merely exemplary and should not be taken by way of limitation) at the end of each string before hashing will be made clearer below but basically these bits ensure that no string will ever be hashed twice, even by different signers at different times, and this property is useful when it comes to security. Bit strings other than those used for illustrative purposes are of course within the scope of the invention. The addition of the bits does not substantially increase the key or signature length of the scheme. The bit strings do increase the security, however. For example, the modified scheme will not be prone to a collision-based attack aimed at the hashed values in the public key. This is because the enemy cannot hope to match a hash of his choosing against more than a single hash in all the hashes of all the public keys.

More precisely, if the enemy computes a pair of strings E and W such that $W = h(E)$, and it so happens that W matches a hashed value in a 1-time scheme for another signer, then this collision will only be useful to the enemy if the suffix of E contains precisely the matching values of I, n, i, and (in this example) 000 or 001. Since these values are different for every hash ever computed (over all time and all signers), there is only one useful target for any string E. As a consequence, it is possible to show that the modified 1-time scheme is $2^{k-1}$-secure (if h is ideal), even when used in conjunction with a collection of N-time schemes. For these reasons, the appended string $I|n|i|b$, where b consists of 3 bits, is a useful security string, although the security string may include any one or more of such components.

The modifications just described for the 1-time schemes work provided that a message of length m is being signed. If a message of length greater than m is being signed, then additional measures need to be taken to protect against the pre-hashing based collision-based attack on long messages known in the prior art.

In the classic pre-hashing step, long messages are first hashed to a given length m by means of a fixed hash function h, and only then are these hashed values signed. Thus, given that h is specified beforehand, nothing prevents an adversary from finding, off-line, an h-collision (i.e., any two messages that are mapped by h to a common m-bit string) in $2^{k/2}$ trials. To defeat this attack, the present invention uses a novel approach. Rather than using the same hash function for signing long messages, the signer, when presented with the ith message, $M_i$, first chooses "on the spot" a random hash function $h_i$ (among those which can be described with m bits), and then signs both a "declaration" that $h_i$ is the ith hash function and the value $h_i(M_i)$. In this way, before the signer has signed any messages, the enemy cannot find off-line any two messages that are guaranteed to be hashed to a common m-bit string (because he has no idea of what hash function will be used). On the other hand, if the enemy has seen the signatures of the first n messages (i.e., if he has seen the signatures of $h_1$, $h_1(M_1), \ldots, h_n, h_n(M_i)$), to attack the pre-hashing step, he must find an index i [1,n] and a message $M_i'$ such that $h_i(M_i')=h_i(M_i)$. But to do this he must invert $h_i$, which is much harder than finding an $h_i$-collision. In fact, if $h_i$ is an ideal hash function, this was take $2^m$ trials instead of $2^{m/2}$.

Preferably, it is desired to randomly select the hash function $h_i$ in a very convenient way. In fact, given a fixed ideal hash function h and a random m-bit string $r_i$, set $h_i(x)=h(r_i|x)$; i.e., function $h_i$ maps an arbitrarily long string x to a m-bit string by first concatenating $r_i$ and x, and then evaluating h on the resulting string. The step of signing $h_i$ is immediately accomplished by making $h_i$'s description (i.e., $r_i$) part of the ith 1-time public key (which is automatically authenticated by the tree as described).

The above changes are now described in the context of the Basic Lamport Scheme. A similar approach will work for any of the 1-time schemes known in the art; indeed, the approach can be used to convert almost any secure scheme for signing a fixed-length message into a secure scheme for signing a message with arbitrary length.

In order to sign long messages, according to the invention a single random k-bit string C is appended to the secret key. A corresponding string $Z=h(C|I|n|010)$ is also be appended to the public key, where I is the identity of the signer and n is the index of the 1-time scheme; the bit string 010 is again merely illustrative). (A new value of C is chosen for each I,n pair. When signing a long message M, the signer first computes $h(M|C|I|n|011)$ and then signs the resulting m-bit string using the modified algorithm described earlier. The signature is augmented by appending the value of C. The verification process is similar to before except that the verifier has the added step of computing $h(M|C|I|n|011)$. The particular bit strings are again merely illustrative and should not be taken by way of limitation.

This modified signature algorithm avoids the collision-based attack which can be used successfully against the Merkle Schemes because any collision must match in the suffix $C|I|n|011$ of the preimage as well as the hashed image. As will be seen, this modification also prevents the adversary from mounting the standard collision-based square-root attack. In fact, it will also be seen that any collection of such 1-time schemes is at least $2^{k-1}$-secure if h is ideal.

With this background of how to securely sign a single message, the problem of securely authenticating the 1-time keys is now addressed. The method used by the Basic LM Scheme is similar to that of the Basic Merkle Scheme in that a tree of hashed values is computed. The important difference is that in the Basic LM Scheme there is the requirement of incorporating security strings into each hash computation, and these security strings need to be tied to the corresponding security strings used in the underlying 1-time scheme. The details are now described.

In the Basic LM Scheme, the signer starts by setting up N 1-time schemes as described above (with or without a common hash function h). It is assumed that N is a power of 2. Let $K_s^{(i)}$ denote the secret key of the ith 1-time scheme and let $K_p^{(i)}$ denote the public key of the i 1-time scheme for $1 \leq i \leq N$. Then the secret key of the N-time scheme is $K_s=(K_s^{(1)}, \ldots, K_s^{(N)})$. The public key of the N-time scheme may then be obtained using a directed acyclic graph (for example a tree) hashing procedure that is described below.

Let $\tau_N$ denote the complete binary tree with N leaves, and label the nodes of $\tau_N$ so that $v_\phi$ is the root (where $\phi$ denotes the empty string), $v_0$ and $v_1$ are the left and right children of $v_\phi$ (resp.), and so that $v_{\alpha 0}$ and $v_{\alpha 1}$ are the left and right children of $v_\alpha$ (resp.) for all $\alpha$ in 0,1 i where i<log N. For example, $\tau_8$ is illustrated in FIG. 1.

Each node in the tree has a special memory location that will contain a k-bit hash value. The value stored in node $v_\alpha$ is $R_\alpha$ for all $\alpha$ ($0 \leq \text{abs}(\alpha) \leq \log N$). The value stored in the jth leaf $v_{bin(j)}$ is:

$$R_{bin(j)}=h(K_p^{(j)}|I|\text{bin}(j)|100) \qquad (1)$$

for $0 \leq j < N$, where bin(j) denotes the binary representation of j, I is the identity string of the user, and h is a hash function with k-bit outputs. (Without loss of generality, one can assume that h is the same hash function that is used in the 1-time schemes.) The bit string 100 is merely exemplary. The addition of the security string $I|\text{bin}(j)|100$ prevents the attacks which are otherwise useful in attacking the Merkle Schemes. The values to be stored in the interior nodes of the tree are computed in a bottom-up fashion as follows. The value stored in node $v_\alpha$ is:

$$R_\alpha=h(R_{\alpha 0}|R_{\alpha 1}|I|\alpha|101) \qquad (2)$$

for all $\alpha(0 \leq \text{abs}(\alpha) < \log N)$. The k-bit value $R_\phi$ that is computed and stored at the root serves as the public key $K_p$ for the N-time scheme.

The signature for a message M is formed as follows. Let i denote the number of signatures performed previously by the owner of the tree $\tau_N$ (for $0 \leq i < N$) and let $b_1 b_2 \ldots b_{\log N}$ denote the log N-bit binary representation of i. In addition, define $a_j=b_1 b_2 \ldots b_{j-1} b_j$ for $1 \leq j \leq \log N$. Then the signature for M will consist of the signature for M produced by the ith 1-time scheme (counting starting with i=0) along with i, the public key $K_p^{(i)}$ of the ith 1-time scheme (as described in the previous two examples), and ($R_{\alpha j} | 1 \leq j \leq \log N$). For example, if i=3 and N=8 (i.e., three of eight signatures have already performed), then the signature for M using the 8-time signature scheme consists of the values of $R_1$, $R_{00}$, and $R_{010}$ from $T_8$ along with 3, $K_p^{(3)}$, and the corresponding one-time signature for M.

Given i, $K_p^{(i)}$, and ($R_{\alpha j} | 1 \leq j \leq \log N$), it is easy for the verifier to check that the signature is authentic. First, the verifier checks that the portion of the signature for the ith one-time scheme is valid assuming that the declared value of $K_p^{(i)}$ is indeed the public key for the ith one-time scheme. Next, the verifier checks that $K_p^{(i)}$ is authentic by computing $R_\alpha$ for all $\alpha$ that are prefixes of bin(i). Note that these are the values contained in nodes that are on the path from leaf i to the root in $\tau_N$. The computation is performed in a bottom-up fashion using Equations 1-2. If the value for $R_\phi$ computed by the verifier matches the public key for the tree, then the signature is authentic. For example, if N=8 and i=3, then the verifier computes:

$$R_{011}=h(K_p^{(3)}|I|011|100),$$

$$R_{01}=h(R_{010}|R_{011}|I|01|101),$$

$$R_0=h(R_{00}|R_{01}|I|0|101), \text{ and}$$

$$R_\phi=h(R_0|R_1|I|101).$$

Figure 2:
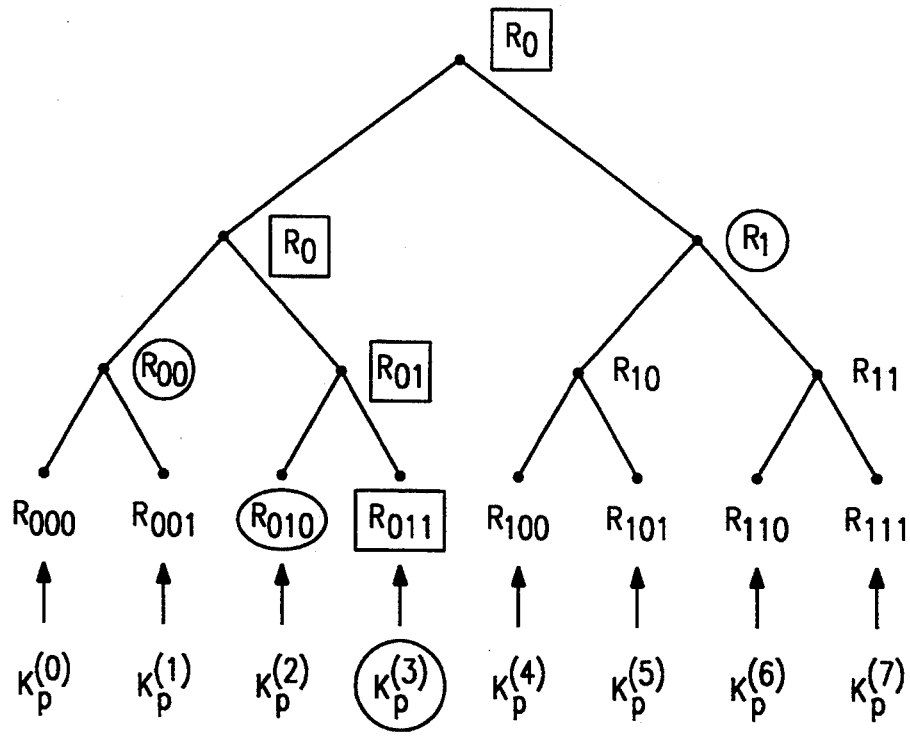
FIG. 2 is an analysis of the binary tree of FIG. 1 showing the computation through an authenticating path.

In this example, the values of $i=3$, $K_p^{(3)}$, $R_{010}$, $R_{00}$, and $R_1$ are provided as part of the signature, and the values of $R_{011}$, $R_{01}$, $R_0$, and $R_\phi$ are computed by the verifier. FIG. 2 shows an example of this computation.

It should be noted that when the signer reveals R-values from $\tau_N$, he or she is not revealing any secrets. Indeed, all of the R-values can be assumed to be public. In fact, if the R-values were published, then the signature could be shorter since then R-values would not need to be included as part of the signature.

The LM Scheme is much more secure than the prior art schemes such as exemplified by the Merkle Scheme. For example, it will be seen that the LM Scheme is $2^{k-1}$-secure if h is ideal. The Merkle Schemes, on the other hand, are known not to be T-secure for any $T \geq 2^{k/2}$. Hence, the Merkle Scheme would need to use a value of k that is at least twice as large as the LM Scheme in order to attain a comparable level of security. This has the effect of increasing the signing and verifying times for the Merkle Scheme by a factor of at least 4, and the signature lengths by a factor of about 4. (Even then, it is not known if the Merkle Schemes are $2^{k/2}$-secure for large k.)

The Basic LM Scheme has a very short public key, fast signing, a reasonable signature length, and high security. The only drawback is memory. In fact, the signer needs to remember N secret 1-time keys, N public 1-time keys, and the $2N-1$ R-values of $\tau_N$. Therefore, the scheme requires the signer to remember a somewhat large amount of data (at least N 1-time secret keys) in order to compute a signature. The memory requirements of the Basic LM Scheme are probably reasonable when N is small or when signing is handled by a large machine. In some applications, however, (e.g., in smart card applications) the signer is not able to store these $\theta(N)$ values in memory, and an alternative approach is desirable.

In such situations, one solution is to produce the random numbers for the secret keys of the 1-time schemes from a pseudo-random number generator. Then, the signer need only remember the seed for the generator in order to reconstruct the tree. If h is an ideal hash function, then it can be used as the pseudo-random number generator. In particular, according to this embodiment it is desirable select a random k-bit seed x and then generate the ith random k-bit string by computing $h(x|I|i|110)$, where I is the identity of the signer, and the bit stream is merely representative.

Thus in the Basic LM Scheme, in order to produce the authenticating paths from $\tau_N$ the signer either needs to remember the $2N-1$ R-values of $\tau_N$, or the signer needs to recompute these values on the fly from the seed for the pseudo-random number generator.

The following describes another solution to the somewhat large memory requirements of the LM Scheme. This description is referred to hereinafter as the Small-Memory LM Scheme, which is the preferred embodiment of the present invention.

The Small-Memory LM Schemes

All of the following small-memory algorithms share a common design. Each consists of two phases: an initialization phase and an on-line phase. The initialization phase is used by the signer to compute the N-time secret and public keys, and to store some crucial values from the tree $\tau_N$. The on-line phase uses the values stored in memory to compute the signature for each new message. It is important to note that the keys and the signature for each message for one of the small-memory schemes are the same as the keys and the signature produced by the Basic LM Scheme.

The initialization phase is the same for all the small-memory algorithms. Preferably, the N-time public and secret key are computed by running the same key-generation program, although different signing algorithms need to remember different intermediate results from this computation. The reason that all the signing algorithms may share the same N-time key-generation algorithm, described below, is due to the fact that the memory required by this algorithm is only $\log N + 1$ k-bit values, which is less than that required by the other portions of the algorithms.

In the on-line phase, the algorithms share the convenient property that the underlying pseudo-random number generator needs only to be run from "left to right," though simultaneously at different and "distant" internal states.

Before beginning use of a tree $\tau_N$ for signing, the public key must be computed and published. This requires computation of all of the R-values. This task can be efficiently completed by running the following procedure (TREEHASH) on $t_N$ until all R-values are computed:

PROCEDURE TREEHASH

Compute $R_{bin(i)} = h(P_i|I|bin(i)|100)$ where $v_{bin(i)}$ is the leftmost leaf for which $R_{bin(i)}$ has not yet been computed.

If there exists an internal node $v_\alpha$ for which $R_{\alpha 0}$ has not yet been computed but for which $R_{\alpha 0}$ and $R_{\alpha 1}$ have been computed, then compute $R_\alpha = h(R_{\alpha 0}|R_{\alpha 1}|I|\alpha|101)$ and deallocate memory space or $R_{\alpha 0}$ and $R_{\alpha 1}$. If there is more than one choice for $v_\alpha$, then choose $v_\alpha$ so that it is highest in the tree, and ten leftmost in its level.

End.

Figure 3:
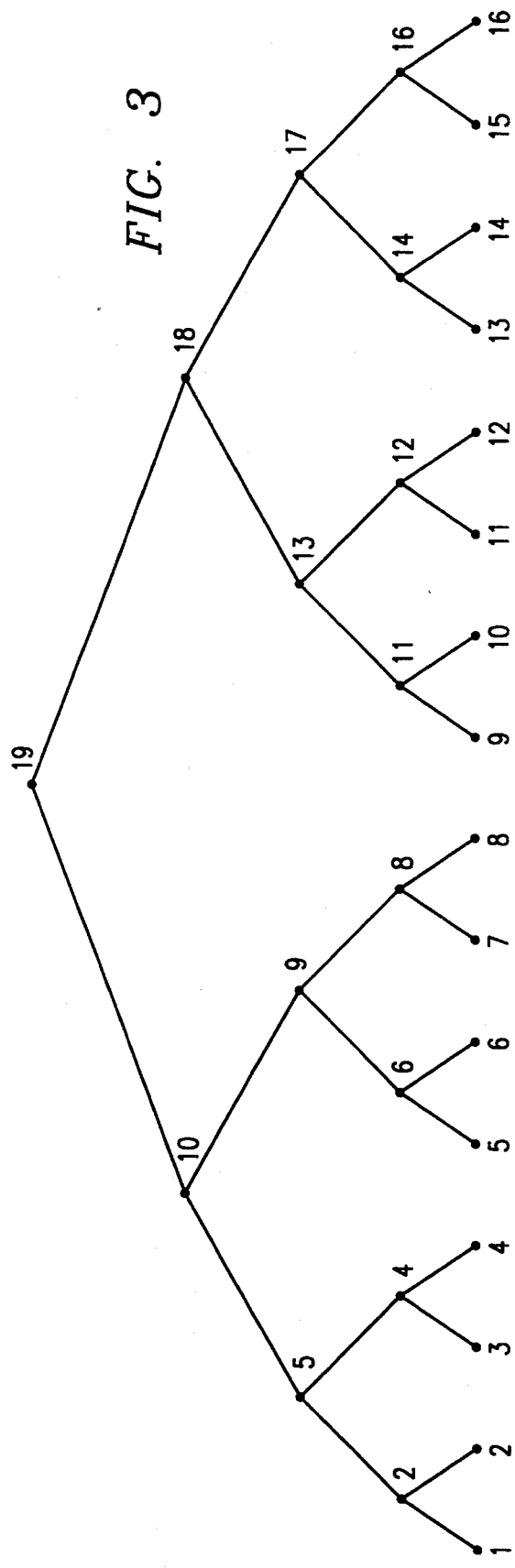
FIG. 3 is a representation of a tree for use by the TREEHASH algorithm according to the $N^{\frac{1}{2}}$ algorithm of the present invention for computing R-values for $\tau_{16}$.

For example, if TREEHASH is repeatedly run on $\tau_{16}$, then the R-values will be computed during the steps shown in FIG. 3.

Figure 4:
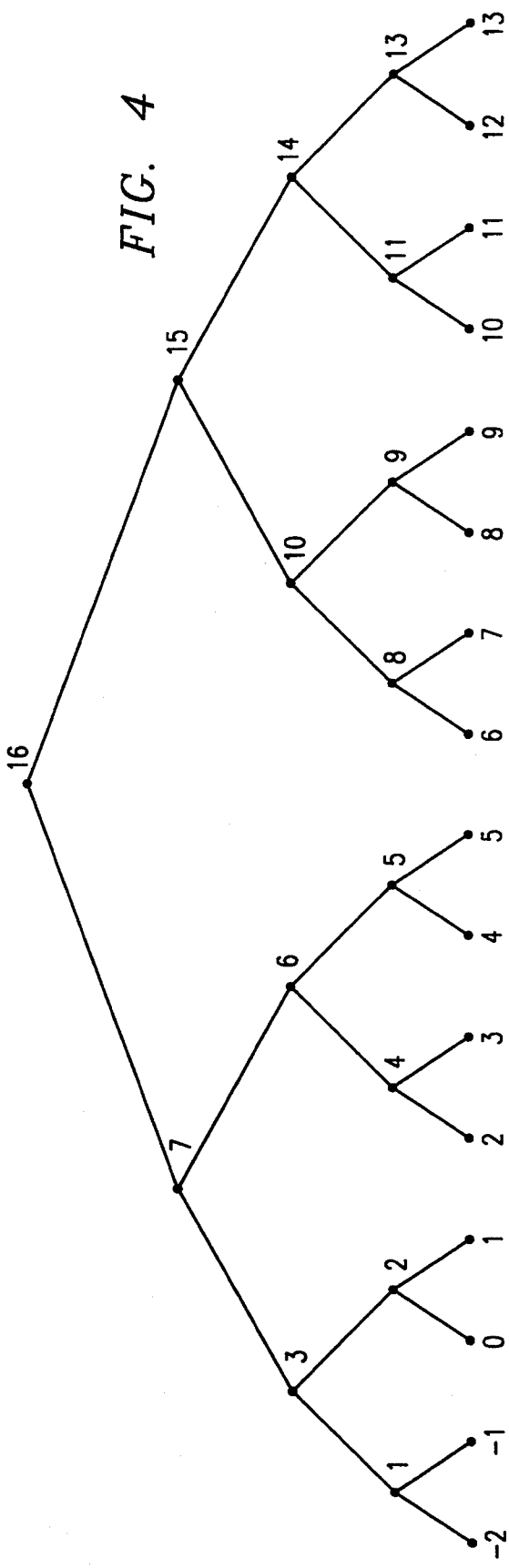
FIG. 4 is a further representation of the tree of FIG. 3 wherein the number on each node denotes the step at which the R-value is computed for that node when the algorithm is repeatedly run on $\tau_{16}$.

It is desirable to start running TREEHASH on a tree $\tau_N$ for which the R-values of the leftmost $\log N - 1$ leaves have been precomputed. In this case, an R-value will be computed for an internal tree node at every step but one (namely step $N - \log N$). An example of such operation is shown in FIG. 4. (Note that the order in which R-values for internal nodes are computed is the same for both examples. This order is known as a post-order.

It is also worth noting that at most $\log N + 1$ R-values need to be remembered at any time when TREEHASH is used to compute R-values (even if the procedure starts with the R-values for the leftmost $\log N$ leaves in memory). For example, only the values of $R_0$, $R_{10}$, $R_{110}$, and $R_{111}$ are remembered before the step when $R_{11}$ is computed. Hence, the public key can be computed using $(\log N + 1)k$ bits of memory space. The time needed to compute all the R-values is somewhat more complicated to analyze. Overall, it is necessary to compute N R-values for leaves and $N-1$ R-values for internal nodes. Each R-value for an internal node can be computed with a single hash computation on a string with about $2k + H$ bits (where H is the number of bits needed to encode the data in the security string). Computing an R-value for a leaf, however, requires regeneration of the public key of the corresponding 1-time signature scheme from the random number generator, and then hashing of this value. Hence, the time required to generate an R-value for a leaf depends on the 1-time scheme that is being used.

Because the small-memory LM schemes have the same keys, signatures, and verification algorithm of the Basic LM Scheme, the security is the same as that offered by the Basic LM Scheme. In other words, the Small-Memory LM Schemes are all $2^{k-1}$-secure.

The $N^{\frac{1}{2}}$-Memory LM Scheme

In order to ensure that one can begin computing signatures without having to recompute large numbers of R-values, it will desirable to remember some of the R-values for the operational phase. In particular, for the following algorithm, it is desirable to remember all the R-values in the top $[\log N/2]+1$ levels of the tree (i.e., levels $0, 1, \ldots, [\log N/2]$) as well as all the R-values in the nodes that are descendents of the leftmost node in level $[\log N/2]$. It is also desired to remember the R-values in the next $[\log N/2]-1$ leaves (i.e., leaves $bin(2^{[\log N/2]}), \ldots, bin(2^{[\log N/2]}+[\log N/2]-2))$. (The levels are defined so that the root is at level 0 and the leaves are at level $\log N$.) A simple calculation reveals that the number of R-values remembered will then be: $2^{[\log N/2]}+2^{[\log N/2]}+[\log N/2]-4=O(\sqrt{N})$. For example, the R-values stored from the initialization phase for $\tau_{16}$ are shown in FIG. 5.

After the initialization phase is complete and the public key ($R_\phi$) has been published, the user can begin to produce signatures. Because the R-values in the top half of $\tau_N$ and in the leftmost $2^{[\log N/2]}$-leaf subtree of $\tau_N$ have been remembered, it is not required to recompute any R-values at all while signing the first $2^{[\log N/2]} \leq$ (- square root of N/2) messages. Hence, for the first $2^{[\log N/2]}$ messages, each N-time signature is no harder to compute than the corresponding 1-time signature.

When the $(2^{[\log N/2]}+1)$st signature is required, however, additional steps are required. In particular, it is necessary to recompute all but $1^{[\log N/2]}-1$ of the R-values of the form $R_{\alpha'\beta}$ where $\alpha'=0 \ldots 01$, $abs(\alpha')=-[\log N/2]$, and $1 \leq abs(\beta) \leq [\log N/2]$. These are the nodes that are descendent from $v_{\alpha'}$ and that comprise the next subtree rooted at level $[\log N/2]$. An example of this computation is shown in FIG. 6.

Since there are $2^{[\log N/2]+1}-2$ R-values stored in the nodes descendent from $v_{\alpha'}$, it will take at least theta($\sqrt{N}$) hashing steps before the $(2^{[\log N/2]}+1)$st signature can be computed. In order to avoid such a lengthy delay between signatures, according to this algortihm it is preferred to begin computing (and remembering) the next set of R-values while producing the first $2^{[\log N/2]}$ signatures. In particular, after each signature is produced using a leaf of the subtree rooted at $v_\alpha$ (where $\alpha=0 \ldots 0$, $abs(\alpha)=[\log N/2]$), it is desired to perform one iteration of procedure MTREEHASH on the subtree rooted at $v_{\alpha'}$. (In addition, once running out of leaves in the subtree rooted at $v_{\alpha'}$, the routine immediately begins computing R-values for leaves in the next subtree while still computing R-values for internal nodes in the subtree rooted at $v_{\alpha'}$.) Procedure MTREEHASH is the same as TREEHASH except that all the hash values that are computed are remembered.

Continuing in this fashion, it is possible to recompute R-values so that only two new R-values (one at a leaf and one at an internal node) are computed after each signature and so that the appropriate R-values are always ready when needed. By removing R-values that are no longer needed from storage, the total memory space can also be kept low. For example, when signing using R-values from the ith subtree rooted at level $[\log N/2]$, it is no longer needed to remember R-values from previous subtrees. In fact, it can be shown that if the memory space for each R-value is deallocated when it is no longer needed, then at most $2^{[\log N/2]+1}+2[\log N/2]-4$ R-values in the bottom $[\log N/2]$ levels will be remembered at any given time. The time needed to produce each signature in this scheme is the time needed to produce a 1-time signature plus the time needed for one iteration of MTREEHASH. The time needed for MTREEHASH is at most the time needed to hash a string with about $2k+H$ bits plus the time needed to produce and hash the public key of another 1-time signature.

The computation of R-values using TREEHASH is performed after each signature. Hence, this computation can be performed off-line and the computation does not depend in any way on the message being signed. Provided that the off-line computation is done, the actual signing process involves little more than looking up the correct R-values (and computing the 1-time signature, which itself involves table lookup and hashing the message). This provides a substantial advantage over schemes such as RSA and DSA which need to perform substantial arithmetic culations (in addition to hashing the message) in order to sign.

In addition, the implementation of the preceding algorithm can be simplified by storing the R-value for each node in the memory location reserved for its sibling in the tree. Then the R-values needed for the ith signature will be contained in the memory locations of the nodes on the path from the ith leaf to the root (instead of the siblings of these nodes). When the R-values are stored in this fashion, deciding when R-values can be deallocated from memory also becomes much easier.

The $N^{\frac{1}{3}}$-Memory LM Scheme

For most applications, the algorithm described in the previous section will be adequate for computing signatures. For applications where space is more limited, however, it is desirable to modify the algorithm so that even less space is used. As before, the algorithm for computing signatures consists of an initialization phase and an operational phase. The initialization phase is the same as the initialization phase described in the Basic LM Scheme except that a different set of R-values for the beginning of the operational phase is remembered. In particular, in this embodiment it is necessary to remember all the R-values in the top $[\log N/3]+1$ levels, along with the R-values in levels $[\log N/3]+1$, $[\log N/3]+2, \ldots [2\log N/3]$ that are descendents of node $v_\alpha$ where alpha$=0 \ldots 0$, $abs(\alpha)=[\log N/3]$, as well as the R-values in levels $[2\log N/3]+1, \ldots, \log N$ that are descendents of node $v_\beta$ where $\beta=0 \ldots 0$, $abs(\beta)=[-2\log N/3]$. In addition, it is necessary to remember the leftmost $\log N-[2\log N/3]-1$ leaves in the next subtree rooted at level $[2\log N/3]$ (this subtree is rooted at the sibling of $v_\beta$) as well as the leftmost $\log N-[\log N/3]-1$ leaves in the next subtree rooted at level $[\log N/3]$ (this subtree is rooted at the sibling of $v_\alpha$). In other words, it is desired to remember the R-values contained in the $([\log N/3]+1)$-level subtree rooted at $v_\epsilon$, the $([2\log N/3]-2\log N/3]+1)$-level subtree rooted at $v_\alpha$ (this is the leftmost subtree rooted on these levels), and the $(\log N-[2\log N/3]+1)$-level subtree rooted at $v_\beta$ (which is also the leftmost subtree rooted on these levels) along with some additional leaves (so that the routine can get a head start on the next set of trees). An example of this calculation is shown in FIG. 7, wherein the R-values at circled nodes are stored for the beginning of the operational phase of the algorithm for $\tau_{64}$.

The operational phase is also similar to that for the $N^{\frac{1}{2}}$ algorithm described above. For the first $2^{\log N - [2\log N/3]} = \theta(N^{\frac{1}{3}})$ signatures, all the necessary R-values are already available. In order to prepare for the second group of $2^{\log N - [2\log N/3]} = \theta(N^{\frac{1}{3}})$ signatures, however, it is desirable to immediately begin to compute R-values in the subtree rooted at $v_{\beta'}$ where $\beta' = 0...01$, $abs(\beta') = [2\log N/3]$. In particular, an iteration of MTREEHASH is performed on the subtree rooted at $v_{\beta'}$ after each of the first $2^{\log N - [2\log N/3]}$ signatures. In addition, once the R-values for the leaves of the subtree rooted at $v_{\beta'}$ are computed, the routine immediately begins processing the leaves in the next subtree rooted on level $[2\log N/3]$.

The routine proceeds computing R-values in subsequent subtrees in this fashion for a total of $2^{\log N - [\log N/3]} = \theta(N^{\frac{2}{3}})$ signatures, at which point additional steps are required. This is because the routine has not yet computed R-values in the $([2\log N/3] - [\log N/3] + 1)$-level subtree rooted at $v_\alpha$ where $\alpha' = 0...01$, $abs(\alpha') = [\log N/3]$. At this stage, the routine then precomputes R-values in this subtree while signing using R-values in the $([2\log N/3] - [\log N/3] + 1)$-level subtree rooted at $v_\alpha$ (just as the routine precomputes R-values for the subtree rooted at $v_{\beta'}$ while signing using R-values in the subtree rooted at $v_\beta$). This task can be accomplished by performing an iteration of the procedure MTREEHASH([-2logN/3]−[logN/3]+1) (hereinafter MTREEHASH(p)) on the entire (log N−[logN/3]+1)-level subtree rooted at $v_{\alpha'}$ after each signature using R-values from the subtree rooted at $v_\alpha$.

Overall, it is necessary to run one iteration of MTREEHASH on a tree rooted on level $[2\log N/3]$ and one iteration of MTREEHASH(p) on a tree rooted on level $[\log N/3]$ after each signature in order to guarantee that the appropriate R-values will always be available in memory when they are needed. Hence, it is necessary to perform two iterations of MTREEHASH after every signature.

The $O(tN^{1/t} + t\log N)$-Memory LM Scheme

The previous approach can be improved by maintaining R-values in t groups of subtrees, each with about $[\log N/t] + 1$ levels. In the initialization phase, the routine remembers all the R-values in levels $0, 1, ..., [\log N/t]$, those R-values in levels $[\log N/t]+1, ..., [2\log N/t]$ that are descendents of node $v_\alpha$ where $\alpha = 0...0$, $abs(\alpha) = [\log N/t]$, those R-values in levels $[2\log N/t]+1, ..., [3\log N/t]$ that are descendents of node $v_\beta$ where $\beta = 0...0$, $abs(\beta) = [2\log N/t]$, and so forth. In addition, it is necessary to remember the R-values in the leftmost $\log N - [\log N/t] - 1$ leaves of the next subtree rooted on level $[\log N/t]$, the leftmost $\log N - [2\log N/t] - 1$ leaves of the next subtree rooted on level $[2\log N/t]$, and so forth.

After each signature, the routine performs one iteration of MTREEHASH$([(i+1)\log N/t] - [(i)\log N/t]+1)$ on a subtree rooted at level $[(i)\log N/t]$ for $i = 1, 2, ..., t-1$. Hence, a total of $t-1$ iterations of TREEHASH are performed after each signature to guarantee that all the necessary R-values are ready and stored for the next signature.

As previously described, it is noteworthy that the computation of R-values using TREEHASH can be performed off-line. Once given the message to sign, it is only necessary to compute the 1-time signature and retrieve the appropriate log N R-values from memory.

It is now possible to to integrate the LM Schemes described above for two specific example applications. In the first example, consider a scenario where the signing machine is a smart card (where storage space is small and only a relatively small number of signatures will ever be needed). In the second example, consider a scenario where the signing machine is very large and where N is very large. The value of k=m will be set at 64 for both examples. This means that if h is ideal, then the schemes will be 263-secure, which affords more security than the DES Standard (for example). Larger values of k may also be used for greater security, but the space, time, and key lengths will increase accordingly.

Assume also that the 1-time scheme used in conjunction with the N-time scheme will be the same for both cases. In particular, in these examples the Partitioned Lamport/2 Scheme will be used with $q=4$, $r=16$, $n \leq 240$, $d=8$, and $s=2$.

The Case $N = 2^{14} = 16,384$

For small values of N, in this example the $N^{\frac{1}{2}}$ algorithm is used to produce authenticating paths. The 1-time portion of each signature will consist of $(r+s)k = 1152$ bits. The N-time portion of the signature consists of log N R-values, which requires another k log $N = 896$ bits. Note that the public key for the 1-time signature does not need to be included as part of the N-time signature since the verifier can simply recompute the public key on his or her own from the message that is being signed and the signature. (The verification of the recomputed public key will be performed using the R-values from the tree.) Hence, each signature in the N-time scheme will consist of $1152 + 896 = 2048$ bits. This is about twice the length of signatures produced by DSA or RSA. On the other hand, the length of the public key in the N-time scheme is only 64 bits, which is a factor of about 15 less than that for DSA and RSA.

The time to sign depends on which algorithm is used and on how much space is available. For example, if the $N^{\frac{1}{2}}$ algorithm is used, it is necessary to perform one iteration of TREEHASH after each signature. This will require performing one hash computation on a string of length about $2k+H$ at an internal node of the tree, as well as enough hashes to regnerate the R-value at a leaf of the tree. Regenerating the R-value at a leaf will require at most $18 \times 15 = 270$ hash computations on strings of length about $k+H$ and a single hash computation on a string of length about $18k+H$. In addition, it is necessary to regenerate the private key at the leaf from the random number generator. The cost of using the random number generator varies, of course, depending on the generator that is used, but should be on the order of the time required to hash a few dozen strings of length k. Overall, the cost of each iteration of TREEHASH should be less than the time required to hash 3000 bytes of data.

In addition, it is necessary to account for the time to form the 1-time signature. The 1-time signature can be formed from the private key using at most 270 hash computations (although, on average, the number will be less than half this amount). The private key can be obtained from the random number generator with a few dozen additional hashes, all on strings of length about $k+H$. Overall, the entire cost of forming each N-time signature should be less than the time required to hash the message being signed along with an additional 5500 bytes of data. Since most of the 5500 hash computations are independent of each other, much of the hashing can be pipelined, and so the signing of most messages should be easy to accomplish in well under a second using a simple processor. Moreover, aside from hashing the message itself, all of the hashing can be performed after signing in an off-line mode. Only the hashing of the message needs to be done on-line.

The total memory requirements of the preceding algorithm are also quite modest. In particular, all that is needed is about 4168 bytes of storage space to store 521 R-values using the algorithm. This is well within the capacity of typical smart cards. In addition, the amount can be dramatily reduced by using one of the more space-efficient algorithms described in the $N^{\frac{1}{2}}$ LM Scheme. If, on the other hand, all possible 270 hash values for the 1-time portion of the signature are precomputed and stored, then the storage needed will increase by 2150 bytes. Preferably, it will be desirable to precompute and store a fraction of these values so that signing will still be fast and so that the added memory requirement will be lowered. For example, by storing every fourth hash value in the 1-time scheme, the time to sign increases by at most 54 hashes and the memory required increases by at most 540 bytes.

In order to verify the signature, it is first necessary to verify the 1-time portion of the signature, computing the public key for the 1-time scheme as the routine continues. In order to verify the 1-time signature, it is necessary to to hash the message and to perform at most $(2q-1)(r+s)=270$ hash computations (although, on average, less than half this number will actually be required). Each hash computation is performed on a string with about $k+H$ bits (depending on the security strings that are used). In order to verify the 1-time public key, it is necessary to perform an additional $\log N+1$ hashes. All but one of these hashes is performed on a string of length about $2k+H$ (depending on the security strings that are used). The one longer hash (of the 1-time public key) is on a string of length about 18 k. Overall, the time to verify an N-time signature is at most the time needed to hash the message along with at most 3000 bytes of data. As with signing, the hashing process can be fully pipelined and is easy to accomplish in well under a second using a simple processor.

The signing and verifying times cited above can be decreased by using a different 1-time scheme in conjunction with the N-time signature algorithm. In particular, if the Lamport/2 scheme is used, the signing time is decreased by a factor of about two and the verifying time by a factor of about three.

The Case $N=2^{33}=8,589,959,168$

For large values of N, it is desirable to use the $N^{\frac{1}{2}}$ Scheme to compute the authenticating paths. The 1-time portion of each signature is the same as for the case when $N=2^{14}$. The N-time portion of the signature consists of $64 \log N=2112$ bits for an overall signature length of 3264 bits. This is about three times the length of signatures using DSA or RSA. The public key length remains unchanged at 64 bits.

As before, each iteration of TREEHASH will involve hashing about 3000 bytes of data, and forming the 1-time portion of the signature will involve the equivalent of hashing about 2500 bytes of data. The only difference from before is that we now run TREEHASH twice after each signature instead of once. Hence, in order to sign, we will need to hash the message along with about 8500 additional bytes of data. As before, the hashing of the additional 8500 bytes of data can be performed after signing in an off-line fashion. Once again, this task should be doable in well under a second using a simple processor.

When $N=2^{33}$ and this algorithm is used, it is necessary to have at most 100,000 bytes of memory in order to store R-values and the hashes for the 1-time portion of the signature. The space requirement can be reduced further using the methods described above, although space reduction is not likely to be an issue when the signing is performed using a workstation-size machine.

As before, verification involves hashing the message along with about 3000 bytes worth of additional data. This task can easily be accomplished in under a second using a simple processor. In addition, the signing and verifying times can be decreased by a factor of two or more by using the Lamport/2 scheme described.

Variations

The LM Scheme can be modified to sign an arbitrarily large number of messages by using the Nth signature of an N-time tree to sign the public key of a new tree with N or more leaves. This way, the signer can sign as many messages as needed over time. The length of each signature will increase each time that a new tree is started, however.

A similar approach can be used to decrease the length of the first (for example) 1000 signatures computed by each user. For example, by splicing a depth 20 tree into a depth 10 tree, the authenticating path for the first 1000 signatures will contain only 11 R-values, whereas the paths for the next 1,000,000 signatures will have 21 R-values.

In scenarios where signature length is an important constraint, several methods may be used to decrease the length of LM Scheme signatures. For example, by increasing the parameter Q of the Partitioned Lamport/2 scheme used for 1-time signatures, the signature lengths can be decreased proportionately.

Alternatively, we can modify the basic tree used to form the signatures. For example, by joining a depth 20 tree to a depth 10 tree at the root, we will have $2^{10}$ leaves at level 11 and $2^{20}$ leaves at level 21. This means that the authenticating path for $2^{10}$ signatures will contain only 11 R-values, whereas the paths for the other $2^{20}$ signatures will contain 21 R-values. The shorter signatures can be used for the first $2^{10}$ messages or perhaps for short messages. If the latter approach is used, then the scheme will use shorter signatures for short messages and longer signatures for longer messages.

Signature lengths can also be reduced on applications where the entire authenticating path need not be supplied. For example, consider the scenario (such as in satellite transmissions or nuclear testing monitoring devices) where the signer is authenticating messages for the benefit of the same person or entity (e.g., a government body). In such cases, only these values on the authenticating path that were not present on previous authenticating paths need to be included in the signature. On average, only two new R-values will thus need to be included with each new signature, even when N is very large. Hence, the signature lengths can be decreased dramatically for such applications.

In applications where it is necessary to quickly generate a public key, it may be advantageous to use the LM Scheme in a hierarchical fashion. For example, suppose the scheme is being used in a banking application where each bank employee needs to sign about $2^{10}$ signatures each day. In this case, we could generate a new depth 10 tree for each employee each day. Each tree (and associated public key) can be quickly generated by each employee at the start of each day. The key for each new tree can then be authenticated using a separate instance of the LM Scheme for the branch. (In other words, the bank signs messages of the form "The key for teller i on date j is z" using its signature algorithm.) The public key for each branch can then be signed by the parent bank, and so on.

The advantage of the preceding approach is that the trees for branches and tellers can be generated after the tree for the parent bank is generated (and long after the public key for the bank is published). Hence, the bank need not precompute N 1-time signatures and hash values in order to be able to sign N messages, and the task of computing public keys can be broken up into small pieces which can be handled locally. Such an approach can also be used to decrease signature lengths since it may only be necessary to include the local portion of each authenticating path with each signature.

Although the present invention has been described in the context of using a tree-based hashing procedure to obtain the public-key, it should be appreciated that the techniques of the invention are achievable using a generalized directed acyclic graph (DAG), even if the DAG has more than one authenticating path for each cycle. Thus the tree (wherein there is only one authenticating path per cycle) is a more specialized implementation whereas the invention can be implemented in any DAG such as an array of grid as shown in FIG. 8.

It should be appreciated by those skilled in the art that the specific embodiments disclosed above may be readily utilized as a basis for modifying or designing other techniques for carrying out the same purposes of the present invention. It should also be realized by those skilled in the art that such equivalent constructions do not depart from the spirit and scope of the invention as set forth in the appended claims.

What is claimed is:

1. A method for generating a digital signature of a message, comprising the steps of:
   (a) choosing a secret key including a set of pseudoramdom integers;
   (b) generating a verification key by evaluating at least once a one-way function on a string that is derived at least in part from one or more of the pseudorandom integers and security information associated with a signer; and
   (c) releasing, as the digital signature of the messages, information that enables a verifier to compute a string such that when the one-way function is applied to the string computed by the verifier, some part of the verification key is derived.

2. The method as described in claim 1 wherein the security information includes at least one of the following items: an identifier for the signer, an identifier for the verification key within a set of verification keys, and positional information of the pseudorandom value within a set of pseudorandom values in the secret key.

3. A method for generating a digital signature of a message, comprising the steps of:
   (a) generating a plurality of secret keys and their corresponding verification keys, each secret key and its corresponding verification key being used or digitally signing a single message; and
   (b) authenticating the verification keys by means of a directed acyclic graph according to the following steps:
      (i) associating the verification keys to some nodes of the directed acyclic graph;
      (ii) publishing the values associated with some of the nodes of the directed acyclic graph such that each verification key to be authenticated has a directed path from its node to a node whose value is published, each directed edge of the directed acyclic graph corresponding to obtaining the value associated to its end-node from the value associated to its start node and security information associated with a signer by an operation that includes evaluating a one-way function at least once.

4. The method for digitally signing as described in claim 3 wherein a signer recomputes secret signing keys prior to signing a message by running an efficient algorithm on a short secret seed value such that less than log N additional signing keys need to be reconstructed before signing the message.

5. A method of digitally signing a message comprising the steps of:
   (a) hashing the message to a second string by means of a pseudorandom one-way hash function;
   (b) authenticating the one-way hash function; and
   (c) digitally signing the second string to generate a digital signature of the message.

6. The method as described in claim 5 wherein the one-way nash function is selected by means of a fixed hash function by:
   (a) choosing an auxiliary value;
   (b) selecting the one-way hash function to be a function that hashes the message by evaluating the fixed hash function on the message together with the auxiliary value; and
   (c) authenticating the auxiliary value.

7. The method as described in claim 6 wherein the auxiliary value is chosen to include security information.

8. The method as described in claim 6 wherein the auxiliary value is chosed include a pseudorandom number.

9. A method for providing secure digital signing using a collection of hash functions, where $K_s^{(i)}$ denotes a secret key of an ith 1-time scheme, $K_p^{(i)}$ denotes a public key of an ith 1-time scheme for $1<i<N$, and $K_s=(K_s^{(1)} \ldots K_s^{(N)})$ denotes a secret key of an N-time scheme, wherein a 1-time scheme creates a digital signature that is used with only a single message, comprising the steps of:

generating a directed acyclic graph having a plurality of nodes, each node having a value associated therewith, the value derived at least in part by evaluation a one-way function association with one or more predecessor nodes;

generating a public key for an N-time digital signature scheme from one or more values of the directed acyclic graph; and generating a signature of a message, the signature comprising a 1-time signature for the message produced by an ith 1-time scheme, the public key $K_p^{(i)}$ and a predetermined value derived from the directed acyclic graph.

10. A method to enhance the security of a digital signature scheme, comprising the steps of:
    (a) combining a message to be signed with an auxiliary value to produce a string;
    (b) digitally signing the string; and
    (c) authenticating the auxiliary value.

11. The method as described in claim 10 wherein the auxiliary value is chosen to include security information.

12. The method as described in claim 10 wherein the auxiliary value is chosed include a pseudorandom number.

* * * * *